United States Patent
Shintani et al.

(10) Patent No.: US 7,493,642 B2
(45) Date of Patent: Feb. 17, 2009

(54) METHOD OF SELECTING A PORTION OF A BLOCK OF DATA FOR DISPLAY BASED ON CHARACTERISTICS OF A DISPLAY DEVICE

(75) Inventors: Peter Rae Shintani, San Diego, CA (US); Hirofumi Usui, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 271 days.

(21) Appl. No.: 11/006,065

(22) Filed: Dec. 6, 2004

(65) Prior Publication Data

US 2005/0097604 A1    May 5, 2005

Related U.S. Application Data

(63) Continuation of application No. 09/534,832, filed on Mar. 24, 2000, now Pat. No. 6,839,903.

(51) Int. Cl.
*H04N 5/445* (2006.01)
*G06F 13/00* (2006.01)
*G06F 3/00* (2006.01)

(52) U.S. Cl. .............................. 725/44; 725/39; 725/47
(58) Field of Classification Search ............. 725/39–59, 725/78, 80, 85, 131, 139, 151; 348/441, 348/445, 554–556, 558, 581; 345/699
See application file for complete search history.

(56) References Cited

U.S. PATENT DOCUMENTS

| | | | |
|---|---|---|---|
| 5,384,600 A | | 1/1995 | Kaizaki |
| 5,402,177 A | | 3/1995 | Maeshima |
| 5,486,871 A | | 1/1996 | Filliman |
| 5,587,928 A | | 12/1996 | Jones |
| 5,621,429 A | * | 4/1997 | Yamaashi et al. ........... 348/572 |
| 5,654,738 A | * | 8/1997 | Spurlock .................... 345/699 |
| 5,675,390 A | | 10/1997 | Schindler et al. |
| 5,715,515 A | | 2/1998 | Akins |
| 5,784,123 A | | 7/1998 | Yoshimi |
| 5,808,654 A | | 9/1998 | Loos |
| 5,844,620 A | | 12/1998 | Coleman |
| 5,909,212 A | | 6/1999 | Nishina |
| 5,956,091 A | | 9/1999 | Drewery |
| 6,137,539 A | * | 10/2000 | Lownes et al. .............. 725/139 |
| 6,147,714 A | * | 11/2000 | Terasawa et al. .............. 725/41 |
| 6,166,778 A | * | 12/2000 | Yamamoto et al. ............ 725/40 |
| 6,215,467 B1 | * | 4/2001 | Suga et al. .................. 345/699 |
| 6,310,654 B1 | * | 10/2001 | Oku et al. .................... 348/554 |

(Continued)

*Primary Examiner*—Hunter B. Lonsberry

(57) ABSTRACT

A method of selecting a portion of a block of data for display based on characteristics of a display device. The method comprises several steps. In the first step, a block of Electronic Program Guide (EPG) data is received at a communication device adapted to process this data. Next, an input is received at the communication device regarding an appearance of the display device. The communication device can be a set-top box. The appearance of the display includes, but is not limited to, the resolution, the aspect ratio (AR), and the physical size of the display. Based on these inputs, the communication device next selects a portion, more or fewer columns or rows, of the block of EPG data to be displayed on the display device. The portion of the EPG data selected is formatted and communicated to the display device, e.g. television, for viewing by the user.

21 Claims, 7 Drawing Sheets

U.S. PATENT DOCUMENTS 6,362,853 B1 * 3/2002 Ouchiyama et al. ......... 348/556
6,456,340 B1 * 9/2002 Margulis .................... 348/745
6,476,821 B2 * 11/2002 Sawada et al. .............. 345/620
6,681,395 B1 * 1/2004 Nishi ......................... 725/45

* cited by examiner

|  | 9:00 a.m. WEEK 1 124a | 9:30 a.m. WEEK 1 124b | 10:00 a.m. WEEK 1 124c |
|---|---|---|---|
| CHANNEL 122 | | | |
| ABC 122a | Program A INFO. 128a | | |
| CBS 122b | PROGRAM B INFO. 128b | | |
| NBC 122c | | | |
| FOX 122d | | | |
| PBS 122e | | | |
| PAX 122f | | | |

16:9 A/R DISPLAY 230

FIGURE 2B

| CHANNEL 122 | 9:00 a.m. WEEK 1 124a | 9:30 a.m. WEEK 1 124b |
|---|---|---|
| ABC 122a | Program A INFO. 128a | |
| CBS 122b | PROGRAM B INFO. 128b | |

4:3 A/R DISPLAY 240

FIGURE 2C

METHOD OF SELECTING A PORTION OF A BLOCK OF DATA FOR DISPLAY BASED ON CHARACTERISTICS OF A DISPLAY DEVICE

RELATED APPLICATIONS

This application is related to and claims priority to U.S. patent application Ser. No. 09/534,832 entitled "Method Of Selecting A Portion Of A Block Of Data For Display Based On Characteristics Of A Display Device," by Shintani et al., filed on Mar. 24, 2000, now U.S. Pat. No. 6,839,903 which is incorporated herein by reference.

TECHNICAL FIELD

The field of the present invention pertains to a video device. More particularly, the present invention relates to the field of displaying a portion of a block of data, e.g. an electronic program guide, on a display device based on the display characteristics of the display device.

BACKGROUND ART

As the number of broadcasters increase and the number of new and rerun television (TV) programs and movies increase, a need arises for a method to provide this increasing amount of information to a viewer electronically. Conventional televisions and broadcasters utilize a feature referred to as an Electronic Programming Guide (EPG) to communicate a schedule of upcoming television or movie programs to a viewer via a television screen.

Referring to prior art FIG. 1A, a table 120 of a conventional block of data for an EPG is shown. The table 120 has a top column of time 124 and a vertical column for channel 122. Program information, e.g. program A info. 128a, falls under a specific time, e.g. 9:00 a.m. on week 1 124a, and under a specific broadcaster, e.g. ABC 122a, or media provider, e.g. Gemstar. Specifically, table 120 can span a wide range of time 126, such as one to two weeks of programming information. Similarly, the number of broadcasters 129 displayed can vary significantly. That is, programming information for either a single broadcaster, e.g. ABC 122a, or for multiple broadcasters, e.g. ABC 122a through PAX 122f, can be provided by a carrier.

The block of data is stored in a memory block of the display device, e.g. a television set. Because the entire block of data cannot be displayed at one time, due to the limited size of a television screen and the extreme size of the amount of data in the EPG, a need arises for a method and apparatus to intelligently select and format a suitable amount of data from the block of EPG data to display on the display device.

Conventionally, only a one hour block of EPG scheduling, e.g. block 130 of prior art FIG. 1A, is typically presented on a display device, such as a television screen. This is a very limited span of time for a viewer to plan a viewing schedule. Consequently, a need arises for displaying a wider range of information of the EPG.

Referring to prior art FIG. 1B, a conventional analog television screen and a conventional digital television screen are shown, The conventional analog television screen 102, having a matrix of pixels 106, has a height 103 and a width 104. The relationship between the width 104 and the height 103 of a display is referred to as an aspect ratio (AR). In the case of a conventional analog, television set, the AR is standardized at 4:3. This 4:3 AR is the primary reason for the standardized one-hour EPG scheduling block provided on a television screen. However, with the introduction digital television, ARs different from the standardized 4:3 XR have arisen. For example digital television 104, having a matrix of pixels 108 has a height 109 and a width 116. The corresponding AR of a typical digital television 104 is 16:9 That is, a typical digital television is wider than a conventional analog television. Thus, a need arises for a method and apparatus to provide a wider format of EPG information to a display device.

Unfortunately, a wider format of EPG cannot be used on conventional analog television sets. But if a wider EPG table is displayed on a conventional analog television, it may not be readable because it will be too compressed in the narrower horizontal direction of the conventional display. Conventional analog sets will still be in use when digital television is implemented as the broadcast standard. That is, set-top boxes will be used to provide tuning to both digital and analog television sets. Consequently, broadcasting a standardized EPG display format will not be compatible to both analog and digital television displays. The displayed EPG data will either be too wide for a conventional display device or too narrow for a digital display device. As a result, a need arises for a more flexible method of providing EPG data to a display device.

Furthermore, other display characteristics of a display device can have an effect on how much data from a large block of data can be displayed. For example, display device characteristics, such as resolution and size of the display to name a few, can have an effect on how much data can readably be displayed on the display device. Consequently, a more effective method for displaying EPG information on a display device is needed.

SUMMARY OF THE INVENTION

The present invention provides a method and apparatus to intelligently select and format a suitable amount of data from the block of EPG data to display on a display device. Furthermore, the present invention provides a method for displaying a wider range of information of the EPG than is currently available. That is, the present invention provides a method and apparatus that takes advantage of the wider AR of a wide aspect ratio display, e.g. a digital television, and that displays additional EPG program guide information. At the same time, the present invention provides a method and apparatus that can be adapted to select and format a portion of an EPG block of data that would be suitable to display devices with different ARs, thus accommodating new and legacy devices. The present invention also provides a method and apparatus that optimizes the amount of readable data displayed on the display device based on display device characteristics such as resolution and size of the display device.

Specifically, one embodiment of the present invention provides a method of determining a portion of a block of data to be provide to a display device. In the present embodiment, the method comprises several steps. In the first step, a block of EPG data is received at a communication device adapted to process this data. Next, an input is received at the communication device regarding an appearance of the display device. The communication device can be an integrated or add-on component of a television set or a set-top box. A television set can be adapted to automatically transmit data regarding its appearance, and thus be transparent to the user. The appearance of the display includes, but is not limited to, the resolution, the aspect ratio (AR), and the physical size of the display. Based on these inputs, the communication device will select a portion of the block of EPG data to be displayed on the display device. The portion of the EPG data selected is formatted and communicated to the display device, e.g. television, for viewing by the user.

Another embodiment of the present invention implements the method of determining a portion of a block of data to be provided to a display device by using a processor and memory that can be located in the set-top box or a TV. The steps provided in the previous paragraph are implemented as data and instructions of the memory to be executed by the processor.

These and other advantages of the present invention will become clear to those of ordinary skill in the art after having read the following detailed description of the preferred embodiments which are described herein.

BRIEF DESCRIPTION OF THE DRAWINGS

The accompanying drawings, which are incorporated in, and form a part of, this specification, illustrate embodiments of the invention and, together with the description, serve to explain the principles of the invention. The drawings referred to in this description should be understood as not being drawn to scale except if specifically noted.

PRIOR ART

PRIOR ART

FIG. 2B is a block of EPG data formatted for a 16:9 aspect ratio display device, in accordance with one embodiment of the present invention.

FIG. 2C is a block of EPG data formatted for a 4:3 aspect ratio display device, in accordance with one embodiment of the present invention.

DETAILED DESCRIPTION OF THE INVENTION

Figure 1A:
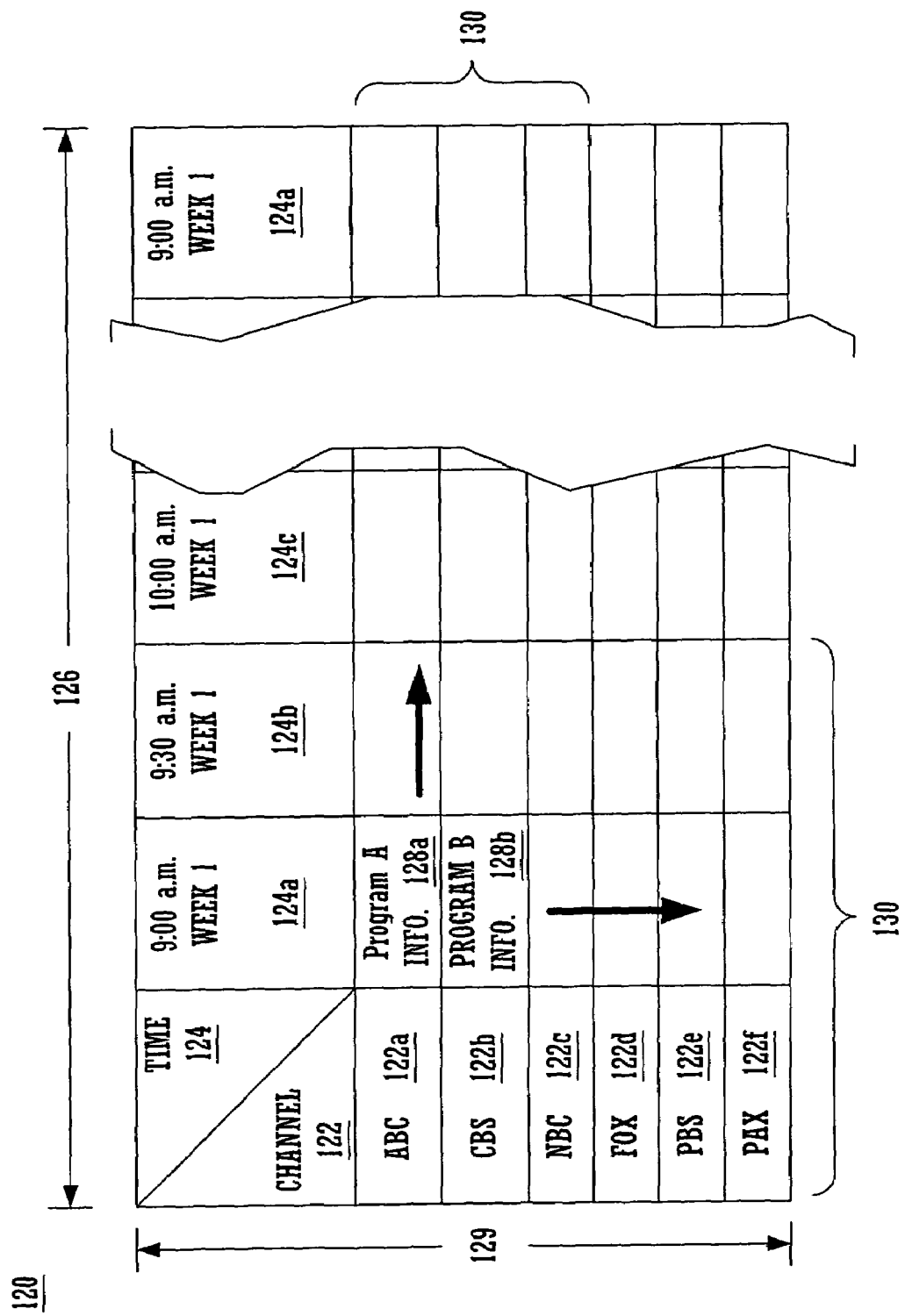
FIG. 1A is a table of a conventional block of data for an Electronic Programming Guide (EPG).
Figure 1B:
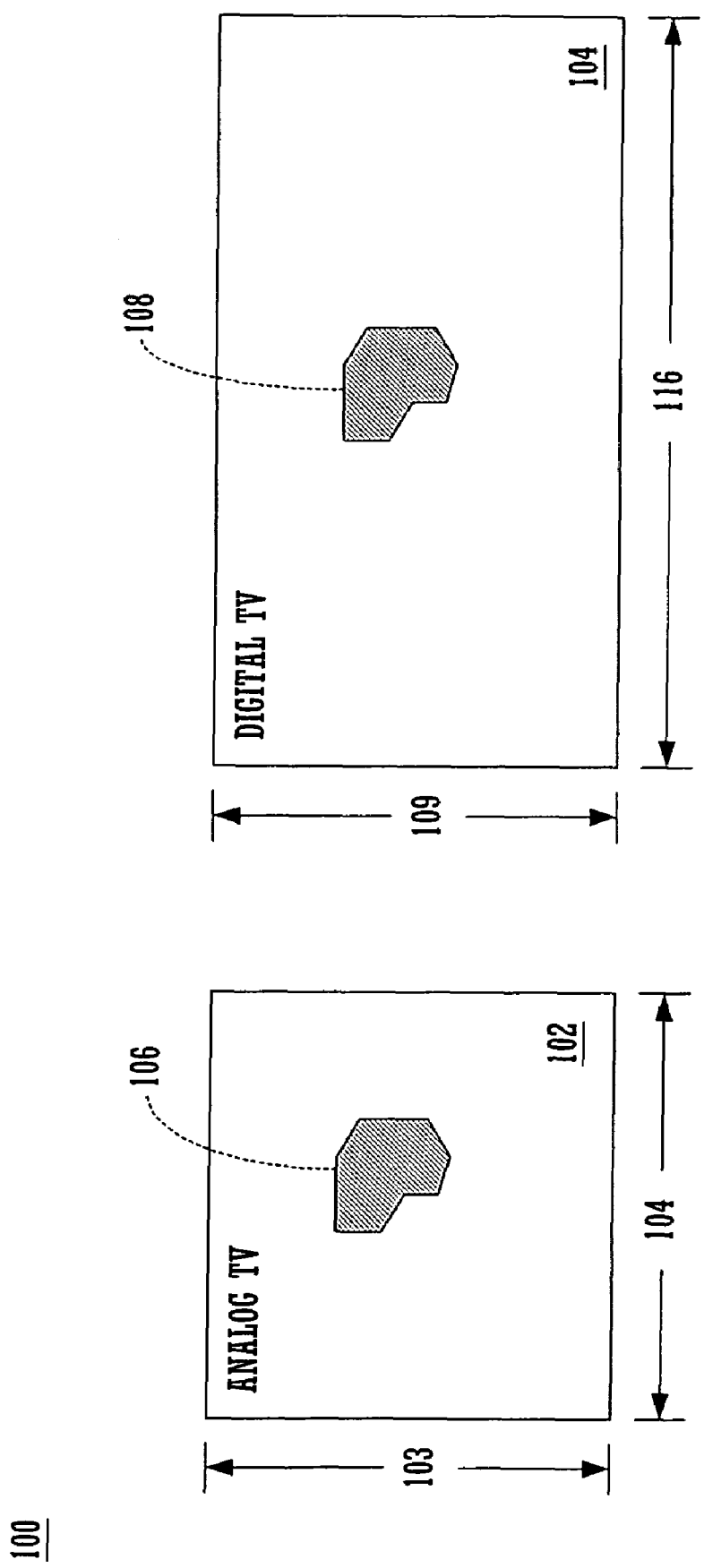
FIG. 1B is a conventional analog television screen and a conventional digital television screen.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g. the processes, are presented in terms of procedures, logic blocks, processing, and other symbolic representations of operations on data bits within a computer or a digital system memory. These descriptions and representations are the means used by those skilled in the arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "selecting," "formatting," "communicating," or the like, refer to the action and processes that can be implemented by an electronic computing device, that manipulates and transforms data. The data is represented as physical (electronic) quantities within the registers and memories of the device, and is transformed into other data similarly represented as physical quantities within the device components, or computer system memories or registers, or other such information storage, transmission or display devices.

Figure 2A:
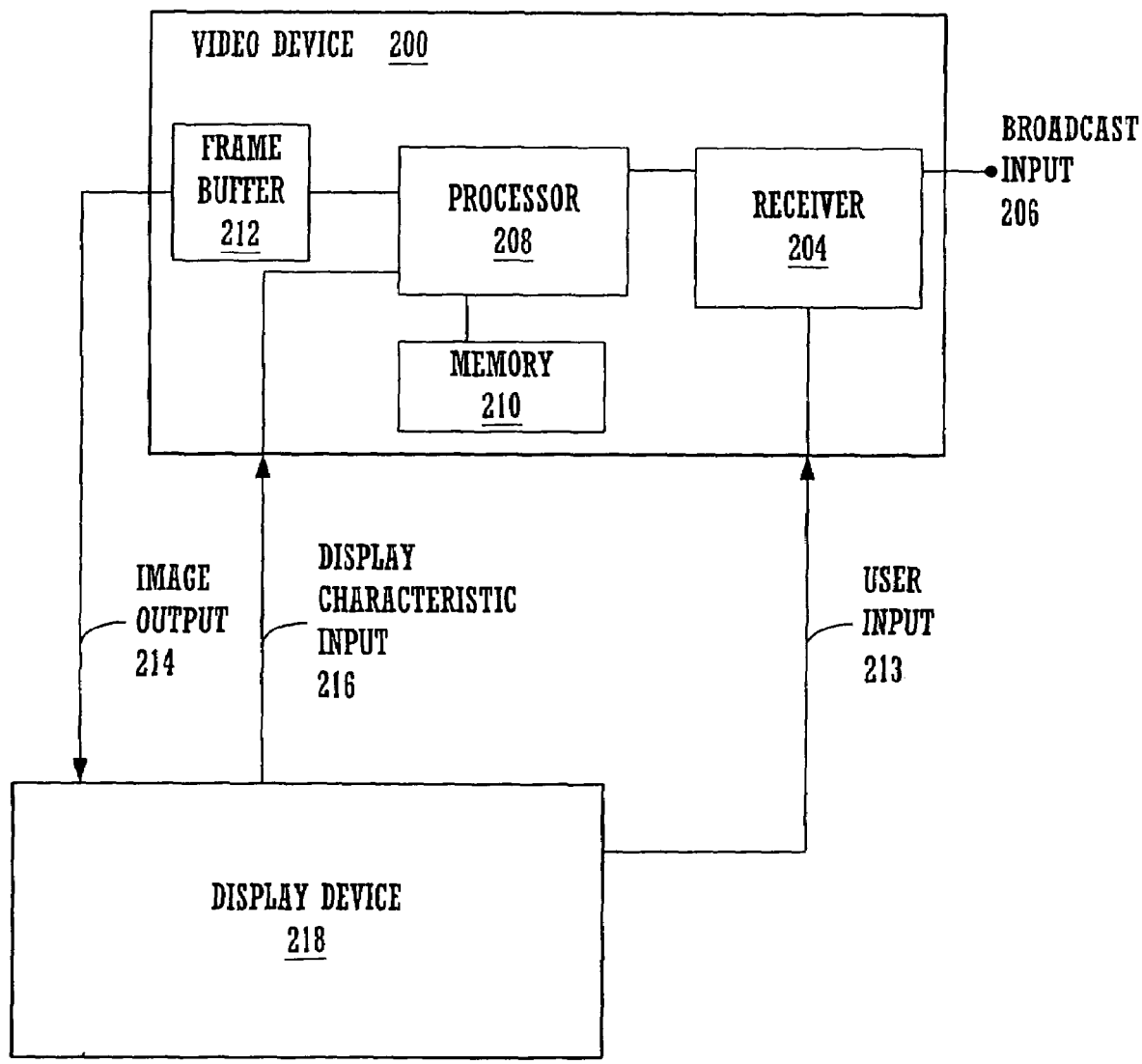
FIG. 2A is a block diagram of a video device, in accordance with one embodiment of the present invention.

Referring now to FIG. 2A, a block diagram of a video device 200 is shown, in accordance with one embodiment of the present invention. Video device 200 can be a display source device in a set-top box, a Personal Computer (PC) having a tuner for video viewing, a. television such as a high resolution digital TV, or some other display device. Video device 200 includes a frame buffer 212, a processor 208, a memory 210, and a receiver 204. Processor 208 is coupled to frame buffer 212, memory 210, and receiver 204. Additionally, broadcast input lead 206, adapted to receive a video signal, is coupled to receiver 204. Broadcast input lead 206 can be adapted to receive a signal via cable, satellite, or antennae.

Additionally, a user input lead 213 is coupled to receiver 204 in FIG. 2A and a display characteristic input lead 216 is coupled to processor 208. User in put lead 213 is adapted to receive a signal from a user of a display device 218. A signal can be provided to user input lead 213 via a number of sources such as a remote control device, a Video Cassette Recorder (VCR), or input devices, such as buttons, located on the display device 218. Display characteristic input lead 216 is adapted to receive a signal from display device 218. In one embodiment, video device 200 can have only a display characteristic input lead 216 and no user input lead 213. In archer embodiment video device 200 can have only user input lead 213 and no display characteristic input lead 216.

Video device 200 of FIG. 2A provides a single output on image output lead 214, which is coupled to frame buffer 212. Frame buffer 212 is adapted to provide a formatted frame showing a portion of the EPG table. While the components of video device 200 are shown in a specific arrangement and a specific coupling configuration, the present invention is well-suited to adding other components and to altering the coupling configuration to suit specialized applications Memory 210 used in video device 200, for the present invention, can either be permanent memory, such as read only memory (ROM), or temporary memory such as random access memory (RAM). Memory 210 can also be any other type of memory storage, capable of containing program instructions, such as a hard drive, a CD ROM or flash memory. Furthermore, processor 208 can either be a dedicated controller, an existing system processor, a microprocessor, or some form of a state machine.

Referring now to FIG. 2B, a block of EPG data formatted for a 16:9 aspect ratio display device 230, in accordance with one embodiment of the present invention. Because display device 230 has a wider aspect ratio than a conventional television, it can display a larger portion of a block of EPG data. Consequently, the 9:00 a.m. slot 124a through the 10:00 a.m. slot 124c and the ABC channel 122a through the PAX channel 122f can all be displayed at once. While the present embodiment shows a specific quantity of time slots and channels, the present invention is well-suited to displaying a wide range of time slots and channels.

Referring, now to FIG. 2C, a block of EPG data formatted for a 4:3 aspect ratio display device 240, in accordance with one embodiment of the present invention. Because display device 240 has a conventional aspect ratio, it can only display a nominal portion of a block of EPG data. Consequently only the 9:00 am. slot 124a through the 9:30 am. slot 124b and the ABC channel 122a through the CBS channel 122b can all be displayed at once. While the present embodiment shows a specific quantity of time slots and channels for a 4:3 aspect ratio display device, the present invention is well-suited to displaying a wide range of time slots and channels. Furthermore, the present invention is well-suited to providing display information for a display device with any aspect ratio. The two embodiments provided in FIGS. 2B and 2C were chosen because they are standards. In one embodiment. FIG. 2B is a digital display device while FIG. 2C is a conventional analog display device Thus, the present invention accommodates both the new digital technology devices as well as the legacy analog devices.

Figure 3:
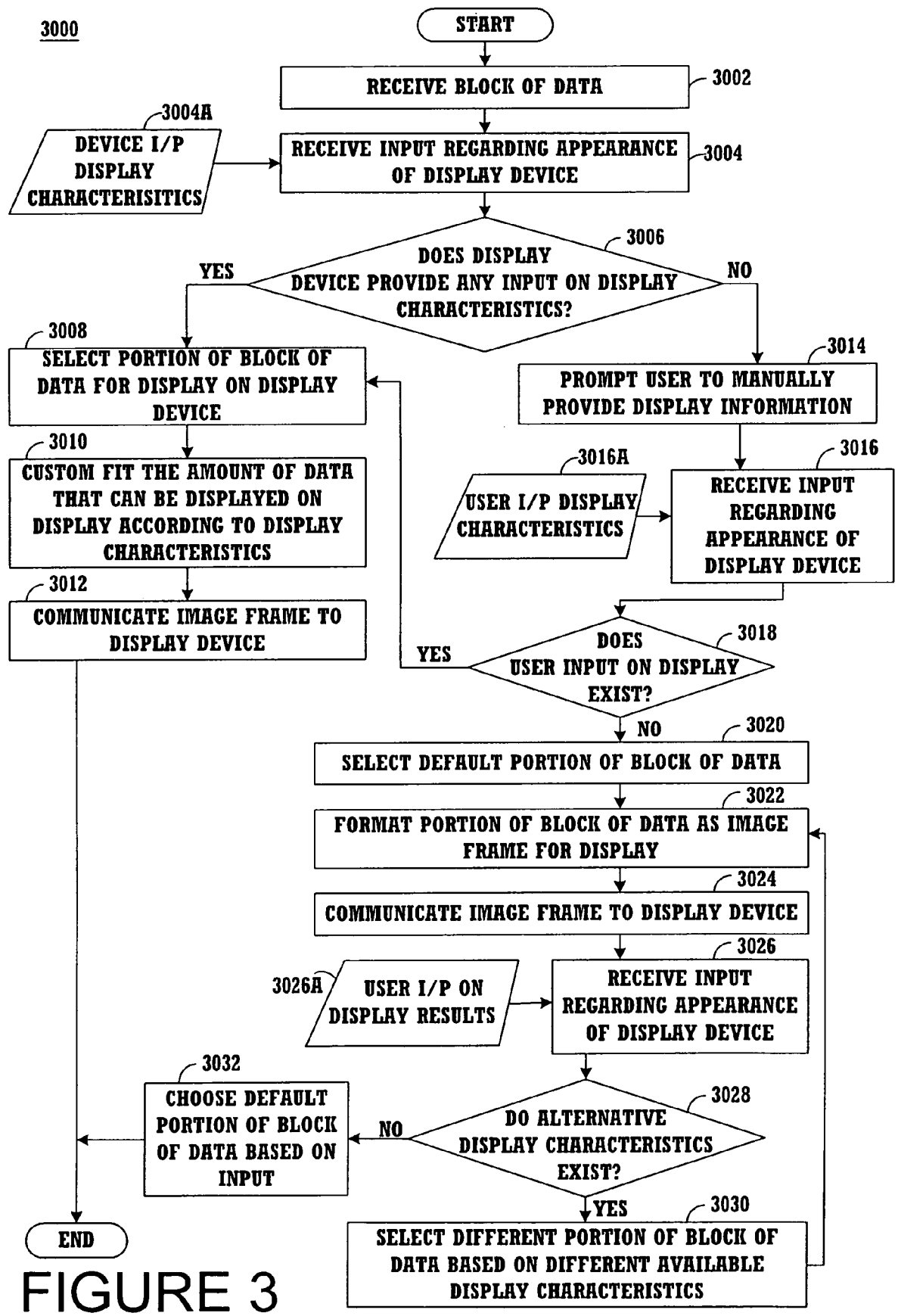
FIG. 3 is a flowchart of the steps performed to determine a portion of a block of data to be provided to a display device, in accordance with one embodiment of the present invention.

Referring now to FIG. 3 a flowchart is shown of the process performed to determine a portion of a block of data to be provided to a display device, in accordance with one embodiment of the present invention. By using the process 3000 embodiment of the present invention, intelligent formatting can be performed to optimize the amount of EPG data provided on a display device to a viewer. Additionally, the present invention provides for the use of legacy devices, such as conventional analog televisions, with standardized aspect ratios. While the present embodiment implements process 3000 in a digital television set, the present invention can be implemented in other types of devices, such as a Personal Computer (PC) having a tuner for television viewing, or a set-top box. Process 3000 deals with the user interface, human interface, ergonomics, and cosmetic design of any display product that has, or is used for, display data.

Process 3000 begins with step 3002. In step 3002 of the present embodiment, a block of data is received at a video digital data device. Step 3002 is implemented, in one embodiment, by the video digital data device such as video device 200 shown in FIG. 2A. Specifically, video device 200 can receive a block of data at receiver 204 via broadcast input lead 206. In one embodiment, a conventional block of data for EPG, such as that shown in prior art FIG. 1A, can be received at video device 200. Broadcast input lead 206 can be adapted to receive a signal via cable, satellite, antennae, or Internet.

More specifically, the block of data, e.g. the EPG data, can be provided by the broadcaster via many different means. For example, a broadcaster can download two weeks of scheduling information in early morning hours on a semi-monthly basis. Alternatively, a broadcaster of media provider can transmit the block of data in real-time to the display device. Furthermore, transmission of the block of data can occur over any conventional broadcasting means. That is, transmission of the block of data can occur via program transport stream of digital terrestrial broadcast, via cable broadcast, or via satellite broadcast. For example, transmission of the block of data can occur via the National Television Standards Commission (NTSC) use of field 2 line 21 XDS. Alternatively, transmission of the block of data can occur via program specific information protocol (PSIP) A/65 of the Advanced Television Standards Commission (ATSC). In another protocol, normal or APG transmission of the block of data over the Digital Satellite System (DSS) can be used. The Dish Network can also be adapted to provide the block of data. For cable television, either in-band, out-of-band, or DOCSIS protocol can be utilized to provide the block of data.

Alternative embodiments can be used to implement step 3002. For example, while the present embodiment utilizes a standard data block of EPG data, the present invention is well-suited to receiving any size and format of block of EPG data. Furthermore, while the present embodiment specifies the content of the block of data as the EPG data, the present invention can be applied to any block of data to be displayed on a display device. For example, menu setting data for a TV or a VCR can be selected and formatted using the present invention. Following step 3002, process 3000 proceeds to step 3004.

In step 3004 of the present embodiment, input regarding the appearance of the display is received. A display device can provide input 3004a on its display characteristics. Step 3004 and input 3004a are implemented, in one embodiment, by the video device 200 shown in FIG. 2A. Specifically, video device 200 is adapted to receive input 3004a on display characteristic input lead 216 from a display device. This embodiment is applicable when a display device has a component that will automatically transmit data regarding the appearance of the display device. In one embodiment the appearance of the display can include data codes representing the resolution, the aspect ratio (AR), and/or the physical size of the display device. Following step 3004, process 3000 proceeds to step 3006.

In step 3006 of the present embodiment, an inquiry determines whether the display device input 3004a for display characteristics exists. If display characteristics input 3004a does exist, then process 3000 proceeds to step 3008. This case accounts for an intelligent digital television that provides an output of its display characteristics. However, if no display characteristics input exist, then process 3000 proceeds to step 3014. This latter case accounts for legacy analog televisions that have no intelligent output devices. Thus, the present invention, in step 3006, provides the flexibility of accommodating display devices that provide an output and display devices that do not provide an output.

Step 3008 arises if a display characteristics input does exist. In step 3008 of the present invention, a portion of the block of data for display on the display device is selected. Step 3008 is implemented, in one embodiment, by the video device 200 shown in FIG. 2A. Specifically, video device 200 is adapted to analyze display device characteristic input 3004a and decide the appropriate portion of the block of data to display. In one embodiment, the Extended Data Service (XDS) system described in Electronic Industries Association-608 (EIA-608), A or B, and incorporated by reference herein, can be implemented to convey the display characteristics, such as the aspect ratio of the display, in the vertical blanking interval. In an alternative embodiment, display device characteristics can be transmitted along with the broadcast video signal. For example, default aspect ratio data can be transmitted in the digital transport stream of an ATSC broadcast, as well as other proprietary digital broadcasts. The present invention is also well-suited to other aspect ratio signal schemes, such as the International Electrotechnical Commission-1880 (IEC-1880) standard on line 20 of the vertical blanking interval (VBI). Additionally, in a computer environment, display device characteristics can be transmitted using suitable communication protocols, such as the computer monitor standard under Video Electronics Standards Association (VESA). Subsequent process 4000 provides steps that can be utilized for implementing step 3008 of process 3000. Following step 3008, process 3000 proceeds to step 3010.

In step 3010 of the present invention, an amount of data is custom fit for the display device on which it will be displayed, according to its display characteristics. Step 3010 is implemented, in one embodiment, by the video device 200 shown in FIG. 2A. Specifically, frame buffer 212 of video device 200 is adapted to format the block of data, chosen in step 3008, for display on the display device. Methods and apparatus used for formatting the block of data are well-known in the art and are not described herein for purposes of clarity. In one embodiment, the block of data has a single common format, e.g. modular columns and/or rows, that allows variable amounts of data to be formatted for display simply by adding or removing the modular rows or columns. However, the present invention is well-suited to alternative formats of the block of data, such as asymmetrical formatted data. In another embodiment, a font type and size can be customized to provide an optimal display of the data.

Step 3010 of the present invention may also be implemented using anamorphic formatting techniques that magnify or reduce images to dissimilar degrees along different axes. By doing so, the present implementation of step 3010 can custom fit an amount of data for a given display device's display characteristics. For example, one embodiment can use vertical compression (v-compression) with the associated blacked-out top and/or bottom region, to maintain a desired quantity of EPG rows and columns to be displayed on the display device. This latter embodiment can be implemented on either analog or digital display devices. With analog televisions, the present embodiment is well-suited to discrete phosphorous elements, such as the traditional red, green, blue (RGB) dot trio, or to continuous phosphorous elements, e.g. SONY Trinitron™ tube having vertical strips with unlimited resolution. In particular, the v-compression embodiment compresses the vertical distance of the raster in order to provide the appropriate AR for the data, in one embodiment. Step 3010 can also be accomplished by other methods of anamorphic formatting besides v-compression.

The v-compression embodiment for step 3010 can be implemented by automatically programming a receiver to implement the v-compression process. For example, in one embodiment, an EPG data signal, formatted with a 16:9 AR, is received at a receiver for a television having a different AR, such as 4:3. The receiver is automatically programmed to provide the required amount of v-compression to display the intended block of EPG data while maintaining an aesthetic AR of the EPG data displayed. Thus, the 16:9 EPG data is not stretched in a vertical direction to match the 4:3 display AR, but is compressed in the vertical direction with an appropriate black-out strip on the top and/or the bottom of the image. Following step 3010, process 3000 proceeds to step 3012.

In step 3012 of the present invention, the image frame produced by step 3010 is communicated to the display device. Step 3012 is implemented, in one embodiment, by the video device 200 shown in FIG. 2A. Specifically, image output lead 214 is adapted to communicate the image frame, produced by frame buffer 212 of display source device 200, to the display device. Following step 3012, process 3000 ends.

As an example for step 3000 through 3012, if an input indicating a high resolution, high aspect ratio 16:9, large television set is received, relatively large portion of the display block will be selected for subsequent display on the display device. One embodiment of this scenario is presented in FIG. 2B. Compared to conventional EPG display, a one and one-half hour portion, e.g. more columns, of EPG data can be selected for display, and six stations. e.g. more rows, of the EPG data can be selected for display on the display device. That is, in one example, program information for 9:00 am. week 1 column 124a through 10:00 a.m. week 1 column 124c, for stations ABC 122a through PAX 122f can be chosen for subsequent display, as shown in FIG. 2B. While the present example chooses a specific input situation, the present invention is well-suited to a plethora of cases, with their appropriate trade-off FIG. 2C provides an alternative embodiment of a conventional AR display device displaying a narrower and shorter table of EPG data.

Step 3014 arises if no display characteristics input exists, per the inquiry of step 3006. In step 3014 of the present invention, the user is prompted to manually provide display information. Display information can includes data such as the display characteristics of the display device. Step 3014 is implemented, in one embodiment, by the video device 200 shown in FIG. 2A. Specifically, video device 200 is adapted to prompt user via an appropriate message, from memory 210, on image output lead 214 to the display device. Following step 3014, process 3000 proceeds to step 3016.

In step 3016 of the present embodiment, input regarding the appearance of the display is received. Input block 3016a is received as user input display characteristics. Step 3016 and input 3016a are implemented, in one embodiment, by the video device 200 shown in FIG. 2A. Specifically, input from a viewer, or user, can be received via user input lead 212. A signal can be provided to user input lead 213 via a number of sources such as a remote control device, a video cassette recorder (VCR), or input devices, such as buttons, located on the display device, This embodiment is particularly applicable when a display device does not have a component that will automatically transmit data regarding the display characteristics of the display device. In one embodiment the display characteristics of the display device provided by the user can include inputs such as the resolution, the aspect ratio (AR), and the physical size of the display. Additionally, the user can input a user-definable font type and font size for the text of the data to be displayed. Following step 3016, process 3000 proceeds to step 3018.

In step 3018 of the present embodiment, an inquiry determines whether the user input data on display characteristics exists. If user input on display characteristics input does exist, then process 3000 proceeds to step 3008. This case accounts for a user who is able to provide viable input data. However, if no user-supplied display characteristics input exist, then process 3000 proceeds to step 3020. This latter case accounts for a user who is unable to provide viable input data. Thus, the present invention, in Step 3018, provides the flexibility of accommodating cases when the user can and cannot provide useful input data. Following step 3018, process 3000 proceeds to step 3020.

Step 3020 arises if no user-supplied display characteristics input exists. In step 3020 of the present invention, a portion of the block of data is selected, based on minimum display characteristics. Step 3020 is implemented, in one embodiment, by the video device 200 shown in FIG. 2A. Specifically, video device 200 is adapted to select a portion of block of EPG data from memory 210, based on a default value for display characteristics. e.g. a conventional aspect ratio characteristic, also stored in memory 210. Display characteristics, such as minimum available display characteristics, can be pre-programmed in memory 210, received via broadcast input 206, or input by user via input lead 213. While the present embodiment begins with minimum display characteristics, the present invention is well-suited to alternative formats. For example, a median or maximum display characteristic format can be chosen. The present embodiment chooses a medium display characteristic, such as minimum AR, minimum display device size, and minimum resolution, to provide a readable display of EPG data for all possible display devices. From this point, the larger AR, larger size, and/or higher resolution display devices can increase the portion of data to be viewed. Following step 3020, process 3000 proceeds to step 3022.

In step 3022 of the present invention, the portion of the block of data selected is formatted as an image frame for display on the display device. Step 3022 is implemented, in one embodiment, in a similar manner to that presented for step 3010. Following step 3022, process 3000 proceeds to step 3024.

In step 3024 of the present invention, the image frame produced by step 3022 is communicated to the display device. Step 3024 is implemented, in one embodiment, in a similar manner to that presented for step 3012. Following step 3024, process 3000 proceeds to step 3026.

In step 3026 of the present embodiment, input regarding the appearance of the display is received. A user can provide display device characteristics input 3026a. Step 3026 and input 3026a are implemented, in one embodiment, by the video device 200 shown in FIG. 2A. Specifically, input from a viewer, or user, can be received via user input lead 213, indicating the acceptability of the displayed portion of the block of EPG data chosen by the present embodiment, A signal can be provided on user input lead 213 via a number of sources such as a remote control device, a video cassette recorder (VCR), or input devices such as buttons, located on the display device (not shown). In one embodiment the user can provide a binary response, such as "yes" or "no," or a variable response, such as an input from "1" as worst to "10" as best. Following step 3026, process 3000 proceeds to step 3028.

In step 3028 of the present embodiment, an inquiry determines whether an alternative display characteristic exists. If an alternative display characteristic does exist, then process 3000 proceeds to step 3030. This case accounts for a possible display configuration, e.g. a display configuration for a larger size and greater resolution display device format, that has not been reviewed and graded by the viewer. Alternatively, inquiry 3028 can also evaluate user input 3026a as a weighting factor on whether to provide the user with any additional configurations of EPG data. If no alternative display characteristic exist, then process 3000 proceeds to step 3032. This latter case accounts for the point where all available configurations of EPG data have been provided to the viewer for evaluation.

Step 3030 arises if an alternative display characteristic does exist per the inquiry of step 3028. In step 3030 of the present invention, a different portion of the block of data is selected for formatting and displaying on the display device. Step 3030 is implemented, in one embodiment, by the video device 200 shown in FIG. 2A. That is, a different portion, or an increment value of a display device format, e.g. screen size, is retrieved from memory 210 and implemented with respect to a portion of the data block, also stored in memory 210. The present invention is well-suited to many different embodiments for indexing through the possible portions and formats of a block of data. Following step 3030, process 3000 returns to step 3022.

Step 3032 arises if no alternative display characteristics exists. In step 3032 of the present invention, a block of data and a format is chosen as a default value. That is, when the appropriate amount of choices for display format and size have been evaluated, the best choice is labeled as a default value. Input from the user, per input 3026a, is used in the evaluation step. In this manner, the user only has to set up the communication device, used for formatting blocks of data, one time. The default value can be called up and implemented for future viewing of the block of data. In an alternative embodiment, inputs from the user can be weighted to optimize or bias the result. Step 3032 is implemented, in one embodiment, by the video device 200 shown in FIG. 2A. Specifically, video device 200 is adapted to choose a default portion of, and format for, a block of data and to store it in memory as a default value for future use. Step 3032 can alternatively be implemented after step 3012, in one embodiment, to create a default portion and format for a block of data for a display device that provides output. Following step 3032, process 3000 ends.

Figure 4:
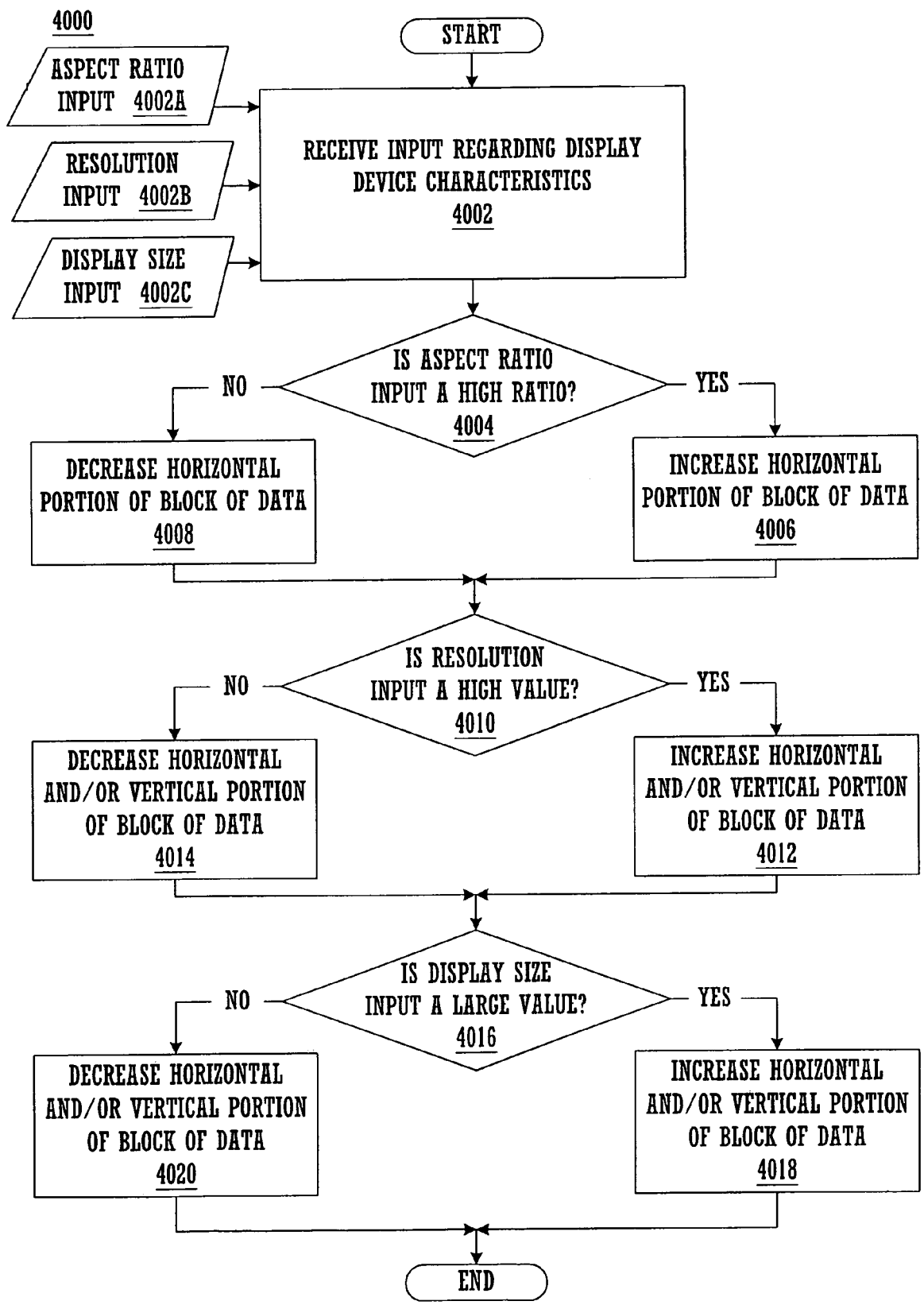
FIG. 4 is a flowchart of the steps performed to determine a portion of a block of data to be provided to a display device based on the display characteristics of the display device, in accordance with one embodiment of the present invention.

Referring now to FIG. 4, a flowchart is shown of the process performed to determine a portion of a block of data to be provided to a display device based on the display characteristics of the display device, in accordance with one embodiment of the present invention. Process 4000 provides one embodiment of the present invention for deciding the appropriate portion and formatting of block of data, such as the electronic programming information (EPG), for subsequent presentation to a display device.

Process 4000 begins with step 4002. In step 4002 of the present embodiment, display characteristics of a display device are received. Step 4002 is implemented, in one embodiment, by the video device 200 shown in FIG. 2A. Inputs on the display characteristics of a display device can he received either on user input lead 213 or display characteristic input 216. Display inputs can include aspect ratio input 4002a, resolution input 4002b and/or display size input 4002c for the display device. Following step 4002, process 4000 proceeds to step 4004.

In step 4004 of the present embodiment, an inquiry determines whether the aspect ratio input is a high ratio. If the aspect ratio is high, then process 4000 proceeds to step 4006. This case accounts for a display aspect ratio corresponding to a digital television, e.g. an aspect ratio of 16:9. However, if the aspect ratio is not high, then process 4000 proceeds to step 4008. This latter case accounts for a display aspect ratio corresponding to a legacy analog display device. Alternatively, aspect ratio input can be compared to a predetermined threshold value stored in memory to decide whether to proceed to step 4006 or step 4008.

Step 4006 arises if the aspect ratio is a high value, as determined by step 4004. In step 4006, a horizontal portion, e.g. the number of columns, of the block of data, is increased to accommodate a higher aspect ratio. The specific value of the increase can be optimized or determined for specific applications. Following step 4006, process 4000 proceeds to step 4010.

Step 4008 arises if the aspect ratio is not a high value, as determined by step 4004. In step 4008, a horizontal portion, e.g. the number of columns, of the block of data, is decreased to accommodate a lower aspect ratio. The specific value of the decrease can be optimized or determined for specific applications. Following step 4008, process 4000 proceeds to step 4010.

In step 4010 of the present embodiment, an inquiry determines whether the resolution input is a high value. If the resolution is a high value, then process 4000 proceeds to step 4012. This case accounts for a display having a high resolution. Typically, a higher resolution display allows for additional bandwidth of data to be displayed. However, if the resolution is not a high value, then process 4000 proceeds to step 4014. This latter case accounts for a display having a low resolution. In one case, the resolution setting can be binary, e.g. high resolution or low resolution. Alternatively, the present invention is well-suited to having a gradient scale having numerous values, and numerous corresponding steps in which to proceed. In yet another embodiment, resolution input can be compared to a predetermined threshold resolution value to decide whether to proceed to step 4012 or step 4014.

Step 4012 arises if the resolution is a high value, as determined by step 4010. In step 4012, a horizontal portion, e.g. the number of columns, of the block of data and/or a vertical portion, e.g. the number of rows, of the block of data is increased to accommodate a higher resolution display device input. The specific value of the increase can be optimized or determined for specific applications. Following step 4012, process 4000 proceeds to step 4016.

Step 4014 arises if the resolution is not a high value, as determined by step 4010. In step 4014, a horizontal portion, e.g. the number of columns, of the block of data and/or a vertical portion, e.g. the number of rows, of the block of data is decreased to accommodate a lower resolution display device input. The specific value of the decrease can be optimized or determined for specific applications. Following step 4014, process 4000 proceeds to step 4016.

In step 4016 of the present embodiment, an inquiry determines whether the display device size input is a high value. If the size input is a high value, then process 4000 proceeds to step 4018. This case accounts for a large display device, which can provide a larger size of the data to be displayed, and thus a greater, and thus finer, amount of data to be displayed. However, if the size input is not a high value, then process 4000 proceeds to step 4020. This latter case accounts for a small display device. Alternatively, size input can be compared to a predetermined threshold value to decide whether to proceed to step 4018 or step 4020.

Step 4018 arises if the size input is a high value, as determined by step 4016. In step 4018, a horizontal portion, e.g. the number of columns, of the block of data and/or a vertical portion, e.g. the number of rows, of the block of data is increased to accommodate a larger size of the display device. The specific value of the increase can be optimized or determined for specific applications. Following step 4018, process 4000 ends.

Step 4020 arises if the size input is not a high value, as determined by step 4016. In step 4020, a horizontal portion, e.g. the number of columns, of the block of data and/or a vertical portion, e.g. the number of rows, of the block of data is decreased to accommodate a smaller size of display device. The specific value of the decrease can be optimized or determined for specific applications. Following step 4020, process 4000 ends.

Additionally, the present invention is well-suited to inputs other than, or in addition to, inputs 4002*a*-4002*c*. Similarly, the present invention is well-suited to additional inquiries relating to additional inputs, along with the appropriate additional subsequent steps.

The potential results of inquiries 4004, 4010, and 4016 can lead to conflicting results for the portion of the block of data to be provided to the display device in the present embodiment. In one case, two different inputs of opposing qualities can have the effect of canceling each other out, with a nominal portion of data being ultimately provided to a display device. In another embodiment, different input values can be weighted depending upon the input, reasoning that one input will have a greater influence on the readability of the displayed information. The present invention is well-suited to many different alternatives for implementing a composite decision for the quantity of vertical and horizontal portion of block of data to display.

While processes 3000 and 4000 of the present embodiment shows a specific sequence and quantity of steps, the present invention is suitable to alternative embodiments. For example, not all the steps provided for processes 3000 and 4000 are required for the present invention. For example, an alternative embodiment of process 3000 can omit steps 3020 through 3032 if the do-loop function is not desired for a given application. Furthermore, additional steps can be added to the steps presented in the present embodiment. Likewise, the sequence of the steps can be modified depending upon the application. While processes 3000 and 4000 are shown as a single serial process, it can also be implemented as a continuous or parallel process.

Many of the instructions for the steps, and the data input and output from the steps of processes 3000 and 4000 are implemented utilizing memory 210 and processor 208, as shown in FIG. 2A. The memory storage 210 of the present embodiment can either be permanent, such as read only memory (ROM), or temporary memory such as random access memory (RAM). Memory 210 can also be any other type of memory storage, capable of containing program instructions, such as a hard drive, a CD ROM, or flash memory. Furthermore, processor 208 can either be a dedicated controller, an existing system processor, or it can be a dedicated digital signal processing (DSP) processor. Alternatively, the instructions can be implemented using some form of a state machine.

In view of the embodiments presented herein, the present invention provides a method and apparatus to intelligently select and format a suitable amount of data from the block of EPG data to display on a display device. Furthermore, the present invention provides a method for displaying a wider range of information of the EPG than is currently available. That is, the present invention provides a method and apparatus that takes advantage of the wider AR of a digital television and that displays additional EPG program guide information. At the same time, the present invention provides a method and apparatus that can be adapted to select and format a portion of an EPG block of data that would be suitable to display devices with different ARs, thus accommodating new and legacy devices. The present invention also provides a method and apparatus that optimizes the amount of readable data displayed on the display device based on display device characteristics such as resolution and size of the display device. While the present embodiments are applied to an EPG block of data, the present invention is well-suited to any block of data including any text-based data or any graphics-based data.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a video device, a method of determining a portion of a block of text-based data to be provided to a display device, said method comprising the steps of:
   a) receiving said block of text-based data;
   b) receiving an input from said display device regarding a characteristic of said display device;
   c) selecting said portion of said block of text-based data corresponding to an array of columns and rows of an electronic programming guide (EPG) to be displayed on said display device based on said input;
   d) formatting said portion of said block of text-based data to create an image frame for said display device; and
   e) communicating said image frame to said display device.

2. The method recited in claim 1 wherein said video device is a set-top box.

3. The method recited in claim 1 further comprising the step of storing said block of text-based data in a memory buffer for subsequent use.

4. The method recited in claim 1 wherein said characteristics of said display device include aspect ratio data regarding said display device.

5. The method recited in claim 1 wherein said includes a screen size and a resolution of said display device.

6. The method recited in claim 1 wherein said block of text-based data is on-screen display information.

7. The method recited in claim 1 wherein said portion of said block of text-based data to be displayed and said formatting of said portion of said block of text-based data is adapted for a display device having a aspect ratio of 4:3.

8. The method recited in claim 1 wherein said portion of said block of text-based data to be displayed and said formatting of said portion of said block of text-based data is adapted for a display device having an aspect ratio of 16:9.

9. The method recited in claim 1 wherein said input is provided by a user.

10. The method recited in claim 1 further comprising the steps of:
    f) selecting, a specific portion of said block of text-based data based on a default value thy aspect ratio, resolution, and screen size of a class of display devices;
    g) communicating an image frame formed by said specific portion of said block of text-based data to said display device;
    h) receiving a second input regarding an appearance of said image frame on said display device;
    i) repeating, steps f) through h) for each of different specific portions of said block of text-based data that are selected based on different available values of aspect ratio, resolution, and screen size of said class of display devices; and
    j) identifying a new default value to be used with said display device based upon said second said appearance.

11. A video device comprising:
    a receiver unit for receiving a block of text-based data;
    a processor coupled to said receiver unit; and
    a computer readable memory coupled to said processor and containing program instructions stored therein that when executed implement a method for determining a portion of said block of text-based data to be provided to a display device, said method comprising the steps of:
    a) receiving said block of text-based data;
    b) receiving an input from said display device regarding a characteristic of said display device;
    c) selecting a portion of said block of text-based data corresponding to an array of columns and rows of on-screen display information to be displayed on said display device based on said input;
    d) formatting said portion of said block of text-based data to create an image frame for said display device; and
    e) communicating said image frame to said display device.

12. The video device recited in claim 11 wherein said video device is a set-top box.

13. The video device recited in claim 11 further comprising a memory buffer coupled to said processor for storing said block of text-based data.

14. The video device recited, in claim 11 wherein said input includes display characteristics of said display device.

15. The video device recited in claim 14 wherein said display characteristic includes a screen size and a resolution of said display device.

16. The video device recited in claim 14 wherein said on-screen display information is Electronic Program Guide (EPG) information.

17. The video device recited in claim 11 wherein said portion of said block of text-based data to be displayed and said formatting of said portion of said block of text-based data is adapted for a display device having an aspect ratio of 4:3.

18. The video device recited in claim 11 wherein said portion of said block of text-based data to be displayed and said formatting of said portion of said block of text-based data is adapted for a display device having an aspect ratio of 16:9.

19. The video device recited in claim 11 wherein said input is provided by a user.

20. The video device recited in claim 11 further comprising the steps of:
    f) selecting, a specific portion of said block of text-based data based on a minimum possible value for aspect ratio, resolution, and screen size of a class of display devices;
    g) communicating an image frame formed by said specific portion of said block of text-based data to said display device;
    h) receiving a second input regarding an appearance of said image frame on said display device;
    i) repeating, steps f) through h) for each of different specific portions of said block of text-based data that are selected based on different available values of aspect ratio, resolution, and screen size of said class of display devices; and
    j) identifying a default value to be used with said display device based upon said second input regarding said appearance.

21. A video display system comprising:
    a) a receiver for receiving a block of text-based data corresponding to electronic programming guide (EPG) information;
    b) a memory unit for storing information regarding a display characteristic of a display screen;

c) a processor for formatting a portion of said block of text-based data corresponding to said EPG information into an array of columns and rows based on said display characteristic of said display screen whereby more columns are displayed if said display characteristics indicate a wide de aspect ratio display;

d) means for providing an output signal to said display screen to display said array; and e) implementing vertical compression of said block of text-based data with a first aspect ratio for display on said display device having a second aspect ratio.

* * * * *